March 22, 1960 R. J. SULLIVAN ET AL 2,929,204
JET SPOILER AND REVERSER
Filed Oct. 1, 1954 4 Sheets-Sheet 1
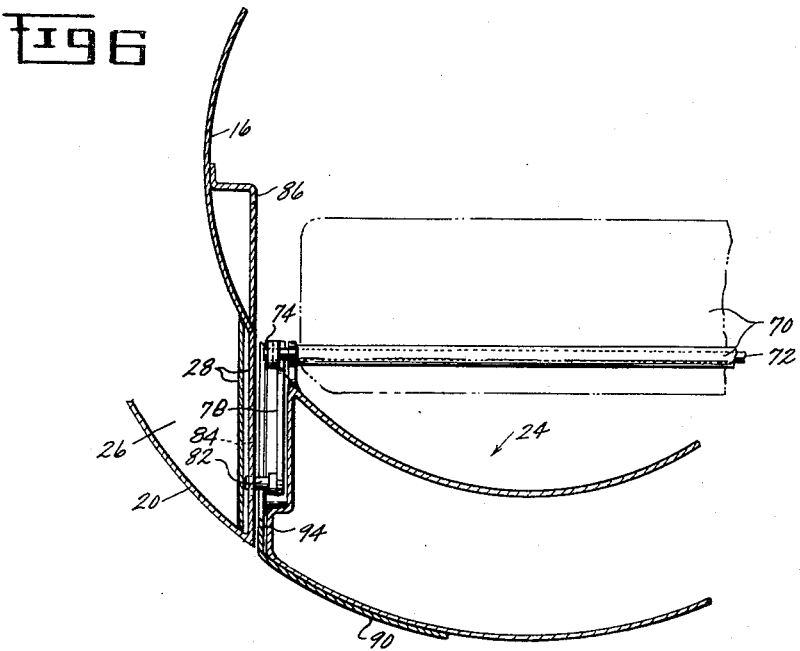
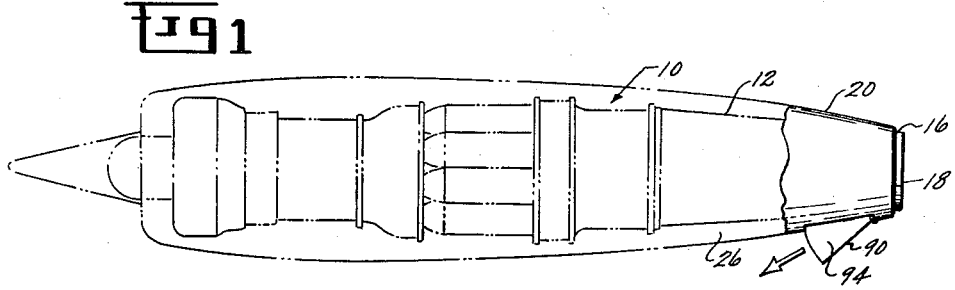
INVENTORS.
ROBERT J. SULLIVAN
DONALD P. McHUGH
BY MILES K. WOLFSON
Edward M. Trittle
THEIR ATTORNEY—

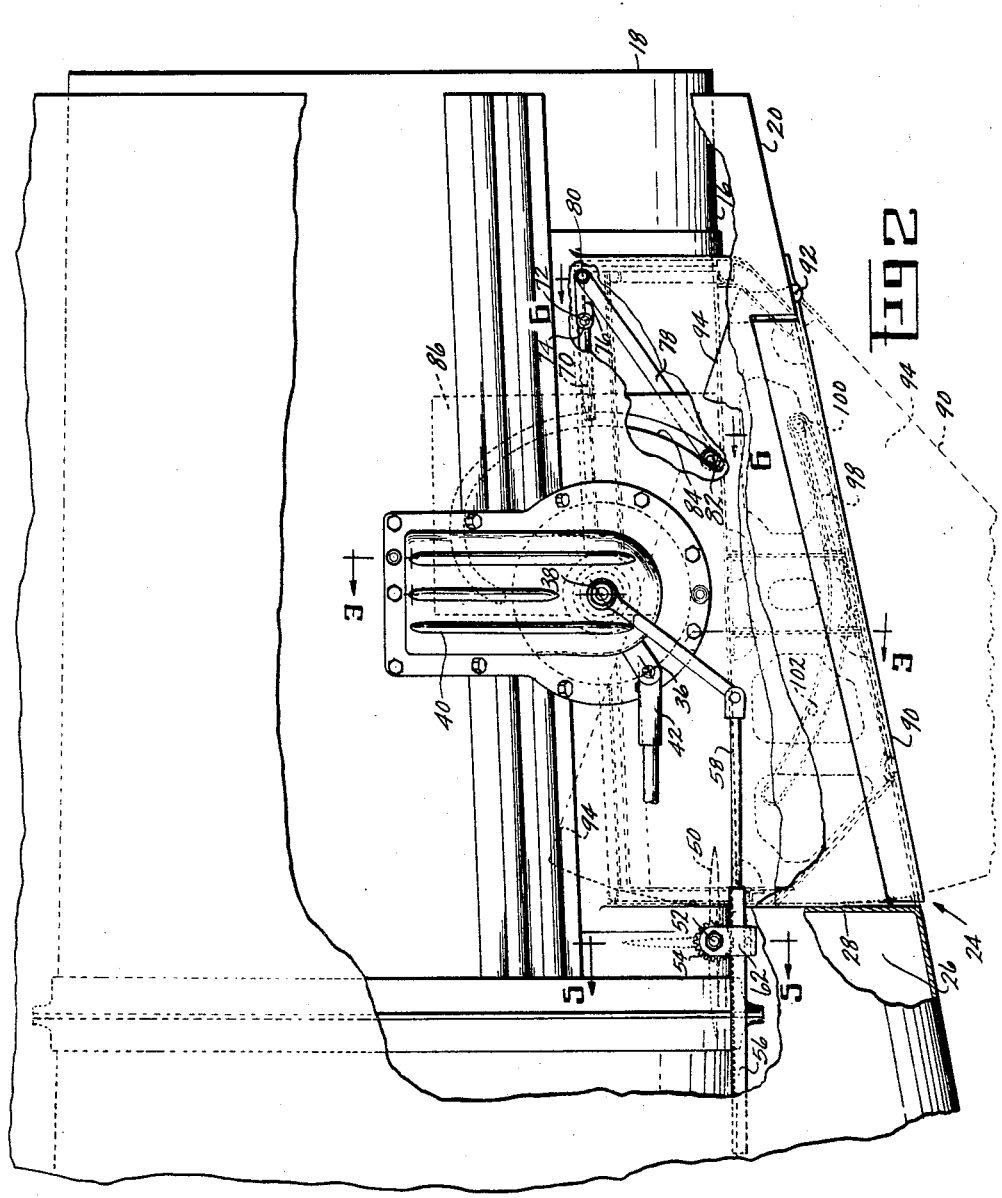

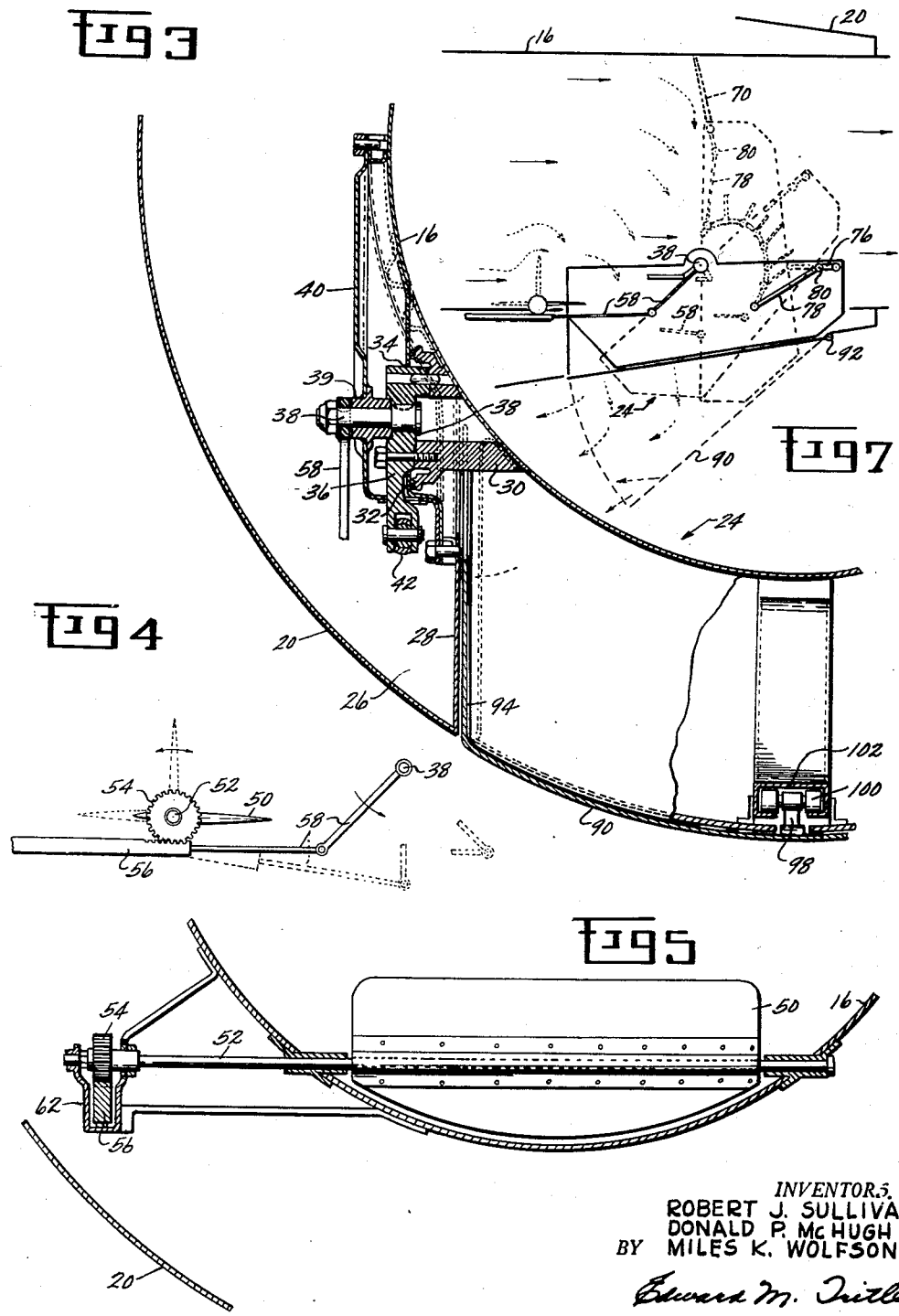

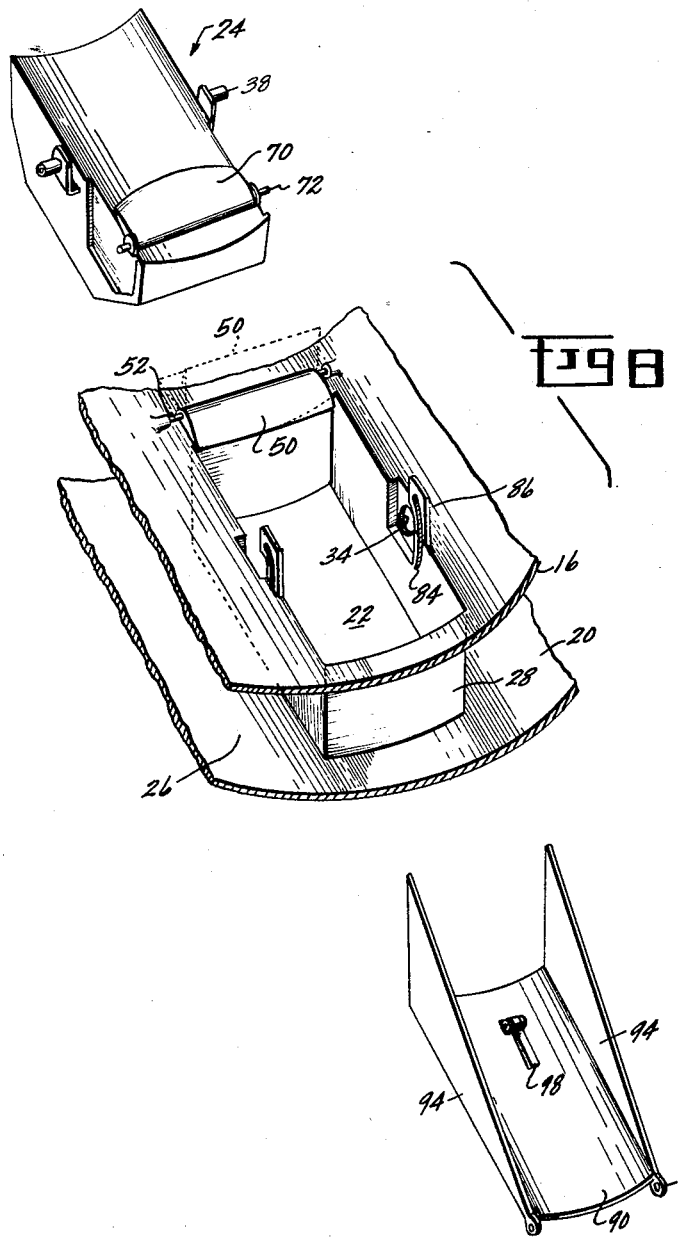

United States Patent Office 2,929,204
Patented Mar. 22, 1960

2,929,204

JET SPOILER AND REVERSER

Robert J. Sullivan, Donald P. McHugh, and Miles K. Wolfson, Cincinnati, Ohio, assignors to General Electric Company, a corporation of New York Application October 1, 1954, Serial No. 459,752

5 Claims. (Cl. 60—35.54)

This invention relates to turbo machines for generating thrust and in particular to a device for spoiling or reversing the thrust of a turbo machine.

It is well-known that large, aerodynamically clean, jet airplanes need extra long runways for landing. Since this type of aircraft lands at high speeds, wheel brakes and aerodynamic brakes have not been able to make the necessary reduction in the landing run of such an aircraft. It is therefore an object of this invention to provide a thrust spoiler or thrust reverser capable of materially reducing the landing run of an aircraft.

It also has become materially important to maintain positive control of engine thrust during the landing approach and touchdown of jet engine aircraft. This is especially true during a wave off when the pilot's flight control problem can be seriously aggravated at times by differences in engine acceleration which cause asymmetric thrust levels with resultant yawing near the aircraft stalling speed. Rapid change over from reverse thrust operation to the normal operation and vice-versa in the shortest period of time becomes an important criteria for any thrust reverser. It is therefore another object of this invention to provide a thrust spoiler or thrust reverser capable of controlling the engine thrust of an aircraft during landing and touchdown.

Still another object of this invention is to provide a thrust reverser or spoiler which permits the engine r.p.m. to be maintained at a high thrust setting and the spoiler or reverser used to limit the net forward thrust to any desired level during approach in landing thereby providing the pilot with full thrust available almost immediately for a wave off by retracting the thrust spoilers or reversers.

It is a further object of this invention to provide a thrust spoiler or reverser in which the thrust spoiler or reverser is fail safe in that any mechanical failure in the operating means of the thrust spoiler or reversing device the thrust spoiler or reverser will be forced to its normal flight position by the gases acting upon it.

After a mechanical failure of the actuating means of the spoiler or reverser, the spoiler or reverser tends to remain in a partial spoiling or reversing position. This is due to the forces of the gases tending to continue to spill out through the spoiler or reverser opening being greater than the forces acting on the spoiler. This prevents the door of the spoiler or reverser from closing. It is, therefore, a still further object of this invention to provide a means for assuring the closing of the door of the reverser of spoiler.

In most thrust spoilers and thrust reverse devices known today there is a tendency to build up back pressure thereby raising turbine inlet temperatures beyond safe limits. It is therefore another object of this invention during spoiling and reversing to provide a device that will not increase the exhaust gas temperature or the turbine inlet temperature.

These and other objects will become more apparent when read in the light of the accompanying specification and drawings wherein like parts have like numbers and wherein the parts are designated by specific names but are intended to be as generic in their application as the prior art will permit, wherein;

Figure 1 is a phantom view of a jet engine having a compressor, combustion chambers and turbine showing the thrust spoiler or reverser in open position.

Figure 2 is a view in broken section showing the spoiler and reverser in various positions in phantom.

Figure 3 is a cross-sectional view taken on line 3—3 of Figure 2 showing how the spoiler and reverser are hinged to the tailpipe.

Figure 4 is an enlarged view showing the front flap actuating means.

Figure 5 is a cross-sectional view of the front flap taken on lines 5—5 of Figure 2.

Figure 6 is a cross-sectional view of the rear flap taken on lines 6—6 of Figure 2.

Figure 7 is a schematic view showing the various positions of the spoiler and reverser.

Figure 8 is an exploded view showing the parts generally.

Referring to the figures, the numeral 10 generally designates a jet engine having a compressor, combustor, turbine and exhaust section. The exhaust section is generally designated as 12 and comprises a tailpipe portion 16, and a nozzle 18. The skin of the engine nacelle surrounding the engine and spaced therefrom is designated as 20. The tailpipe portion 16 and nacelle skin 20 are provided with an opening or discharge passage 22, as best seen in Figure 8, in which a thrust reverse or spoiler device can be placed. The thrust spoiler device is generally designated as 24, and is best shown in Figures 2, 3, 7 and 8.

In order to prevent hot gases from the tailpipe from entering the space 26 between the skin 20 and the engine 10 thorugh the opening 22, a box-like arrangement 28 having defining walls is provided. The box-like arrangement 28 not only seals off the the area 26 from the hot gases, but also serves to support the spoiler and reverser 24.

In order to supply a spoiler to the engine, a box-like spoiler arrangement 24 is provided, and is pivoted transversely to the longitudinal axis of the engine to nest in the box-like arrangement 28. This is best shown in Figures 3, 6 and 8. While spoiler 24 is box-like in the preferred execution shown, it is obvious that a single flap corresponding to the upper surface of 24 may suffice. The box merely adds to the rigidity and provides side walls for cam mechanism hereinafter described. The contour of the spoiler when closed is such that it follows the contour of the tailpipe in order to keep friction losses to a minimum. As shown in Figure 3, the spoiler 24 is provided with a mounting lug 30 which terminates into a seal 32. An opening 34 is provided in the box-like arrangement 28. The seal 32 surrounds the opening 34 so as to prevent further leakage of the hot gases through the opening 34. In order to pivot the spoiler 24, a lever 36 is fixed to the lug 30 as shown in Figure 3 so as to turn together. The lever 36 is fixed to a spindle 38 so as to pivotally support the spoiler 24. The spindle 38 is rotatably mounted in the journal 39 which is in turn supported on the bracket 40. The bracket 40 is fixed to the side of the tailpipe 16 as shown in Figures 2 and 3. The lever 36 is pivotally connected to the actuating rod 42, which in turn is connected to an actuating means (not shown). The bracket 40, journal 39 and spindle 38 rotatably support the spoiler 24. It is noted that although one side is being shown and described the other side of the spoiler is supported in the same manner.

In order to make the spoiler fail safe, that is, in the event of failure of the actuator, the forces acting on the spoiler will automatically unspoil the device, closure of the spoiler 24 is required. However, continued flow of hot gases passing through the opening during spoiling operation tend to keep the spoiler 24 open. To insure closing of the door under fail safe conditions, a fail-safe flap 50 is provided in the tailpipe 16 as best been in Figures 2, 4, 5 and 7. The flap 50 is fixed to a shaft 52 so as to rotate therewith. A pinion 54 is shown fixed to the shaft 52 by splines, or any other accepted or well-known method, so as to rotate together. In meshing engagement with the pinion 54 is a rack 56 pivotally connected to a lever 58. The lever 58 is actuated by connecting it to the spindle 38, which spindle is fixed to the lever 36, so as to turn therewith. Therefore, as the spoiler 24 is rotated, the flap 50 by the linkage means described, will rotate with it. In order to keep the pinion 54 and rack 56 in meshed engagement, a guide 62 (Figures 2 and 5) is shown mounted on the shaft 52 and fixed to the tailpipe 16.

It should be noted, that when member 24 is in the spoiler position, flap 50 is vertical as seen in Figure 5 which position creates turbulence and aids the fluid flow out of the spoiler and reduces the force required to keep member 24 in the spoiling position.

Since all emergency conditions may not require that the spoiler door 24 fully close, other arrangements can be provided. For example, it will be obvious that flaps 50 may be independently operated by any suitable means.

In order to make the spoiler into a reverser a reverser flap 70 or the like can be added as shown in Figures 2 and 6. The flap 70 is shown fixed to a shaft 72 so as to be pivotally mounted to the spoiler at 74. Fixed to the shaft 72 is a lever 76 which is in turn pivotally connected to the actuating lever 78 at 80. The actuating lever 78 is provided with an arm or crosshead 82 which acts as a follower in the fixed cam slot 84. The cam slot is designed to be operative over a limited range so that the reverser flap 70 is not actuated into operative position until approximately the last 10 degrees of rotation. However, the cam slot can be arranged in any other manner to give the desired operation of the flap 70. The cam slot 84 is positioned in the baffle 86 which is part of the wall of box 28 as shown in Figures 2, 6 and 8. It is noted that the specific lever arrangement for operating the flap 70 can be done in other ways as well, and the cam positioned in another location to give the desired operation of the flap.

To further convert the spoiler into a reverser, or to use the arrangement as a combination spoiler and reverser an overlapping door 90 is provided. The door 90 is actually the skin of the nacelle and deflects the hot gases in the reverse direction instead of radially as in the case of the spoiler above. The reverser door 90 is hinged to the skin at 92 so as to rotate about a different pivot point than the spoiler 24. Referring to Figures 2, 3 and 8, the door 90 is provided with baffles or side walls 94 so as to prevent spillage of the hot gases off the the sides of the door 90. Baffles 94 fall within walls 28 when door 90 is closed as seen in Figure 3. The door 90 is actuated by a lever 98 pivotally connected to the door 90 (see Figure 8). The lever 98 at its other end is pivotally connected to a roller bearing cam follower 100 which is positioned in the cam guide or slot 102. The cam guide 102 is secured at its forward end to the bottom side of the spoiler 24 as seen in Figure 3 so that when the spoiler 24 is rotated the cam follower 100 will ride in the guide slot 102 which moves with the spoiler and open or close the door 90 by the lever arm 98. The reverser can include the flap 50 so as to make it fail safe. However, better overall operation of the reverser is obtained by the inactivation of the flap 50 to the dotted position shown in Figure 4 when the flap 70 and door 90 are used.

To spoil the thrust of an engine the actuating means (not shown) is energized so as to operate the actuating rod 42 which in turn actuates the lever 36 for turning the spoiler 24. If the actuator for operating the spoiler 24 should fail, the flap 50 is provided for insuring that the center of pressure of the forces exerted by the hot gases on the spoiler 24 is moved sufficiently high so as to provide sufficient torque to close the spoiler. The tendency for the spoiler to stay open is eliminated by the provision of the flap 50. The flap 50 is positioned forward of spoiler 24 and turns counterclockwise upon opening of the spoiler 24. The flap 50 is actuated by the spoiler itself through spindle 38 and lever 58. It is noted that the difference between spoiling and reversing is only one of degree in that spoiling occurs when the reverse component is not sufficient to overcome the forward thrust and reversing occurs when the reverse component is sufficient to begin overcoming the forward thrust. The addition of the door 90 and flap 70 can be designed to give the requisite reverse component for thrust reversal.

When used as a reverser, the flap 70 positioned on the spoiler 24 is operated by the spoiler 24 and by the cam slot 84 in the baffle 86, actuating the follower 82, so as to give movement to the levers 76 and 78.

In this extended position the door 90 is linked to the spoiler 24 so as to operate therewith. The linkage arrangement 98, cam follower 100 and cam slot 102 connecting the door to the spoiler 24 is so arranged so as to actuate the door approximately 45 degrees while the spoiler 24 is rotated through 90 degrees or 45 degrees beyond the spoiler position. In this way the flap 70, spoiler 24 and door 90 will direct the gases into a reverse direction as shown by the arrows in Figure 7.

When used for spoiling, the spoiler 24 is pivoted at about midway its length or slightly downstream from its midpoint as may be seen in the center section of Figure 8. This is very desirable since only a portion of the spoiler will extend into the exhaust gas stream. A balanced bleed area is therefore maintained so that during thrust spoiling the exhaust gas temperature or turbine inlet temperature will not increase to a detrimental amount. However, the spoiler can be pivoted upstream from its midpoint so that a larger portion projects into the stream as seen in Figures 2 and 7. It is merely a matter of choice where the pivot is placed depending on how much spoiling is desired.

The provision of a single-door control on one side of the engine provides the means for controlling the direction of the hot gases so as to prevent the undesirable direct impingement of the hot gases on a particular part of the aircraft structure. By placing the single door in a position where the hot gases are directed away from the critical parts of the aircraft structure, skin surfaces and other appendages of the aircraft will not be over-temperatured. In the spoilers and thrust reverse devices so far developed today, the hot gases are not sufficiently confined.

Another feature found in this device and not found in other devices of this type, is the aerodynamic fail safe characteristic. The aerodynamic forces on the flaps cause the spoiler to close in case of failure of the actuator. In other words, the device will unspoil in case of the failure of the actuator or any other power failure.

As a result of applicants' invention, this thrust reverser or spoiler is simple to operate and easy to manufacture. Further, the control of the door and flap is simple and not complex as is the case of other devices.

The specific spoiler and thrust reverser were presented as an illustration and not intended as a limitation of applicants' invention. Many improvements may be made to the above disclosure, all of which are to be regarded as equivalents and included within the scope of this invention.

What we claim as new and desire to secure by Letters Patent of the United States is:

1. In a turbo machine, a nacelle, a tailpipe and exhaust nozzle within and spaced from said nacelle, said tailpipe and nacelle having aligned openings therein defining a discharge passage, means for diverting the gas stream, said means including a portion of the tailpipe forming a spoiler pivoted intermediate its ends to the tailpipe to project into the gas stream of the tailpipe, actuating means for operating said spoiler, a fail-safe flap pivoted to said tailpipe upstream of the spoiler and intercepting a portion of the exhaust gases, linkage means connecting said flap and the spoiler such that the reaction of the gas stream on the flap tends to close the spoiler for assuring the closing of said spoiler upon failure of said actuating means.

2. In a turbo-machine, a nacelle, a tailpipe and exhaust nozzle within and spaced from said nacelle, means for diverting the gas stream including aligned openings in the tailpipe and nacelle, walls surrounding said openings and connecting said tailpipe and nacelle, said walls defining a gas passage between the tailpipe and the nacelle, a spoiler mounted in said passage and pivoted intermediate its ends to said tailpipe for rotation relative thereto, a door pivoted to said nacelle and covering the nacelle opening, linkage mechanism connecting said door and said spoiler for conjoint operation, a reverser flap pivoted to said spoiler within the gas stream, a second linkage mechanism between said flap and walls operable over a limited range, and actuating means connected to said spoiler whereby said spoiler and door are operative by said actuating means during part of their rotation to spoil the thrust and said spoiler, door, and reverser flap are operative upon further rotation to reverse the thrust.

3. Apparatus as defined in claim 1 including a fail-safe flap pivoted to said tailpipe and intercepting the exhaust gases, and linkage means connecting said fail-safe flap and the spoiler such that the reaction of the gas stream on the flap tends to close the spoiler whereby the spoiler is fail-safe in that the gas loads acting on the fail-safe flap close the spoiler by said linkage means when the actuator fails.

4. In a turbo-machine, a nacelle, a tailpipe and exhaust nozzle with and spaced from said nacelle, means for diverting the gas stream including aligned openings in the tailpipe and nacelle, a box-like structure surrounding said opening connecting said tailpipe and nacelle, said box-like structure defining a gas passage between the tailpipe and the nacelle, a spoiler mounted in said structure and pivoted intermediate its ends to said tailpipe for rotation relative thereto, a door pivoted to said nacelle for covering the nacelle opening, cam mechanism connecting the door and said spoiler for conjoint operation, a reverser flap pivoted to said spoiler within the gas stream, cam mechanism between said flap and walls operable over a limited range, and actuating means connected to said spoiler whereby said spoiler and door are operative by said actuating means during part of the rotation to spoil the thrust and said spoiler, door, and reverser flap are operative upon further rotation to reverse the thrust.

5. Apparatus as defined in claim 4 including a fail-safe flap pivoted to said tailpipe upstream of the spoiler and intercepting the exhaust gases, and linkage means connecting said fail-safe flap and the spoiler such that the reaction of the gas stream on the flap tends to close the spoiler, whereby the spoiler is fail-safe in that the gas loads acting on the fail-safe flap close the spoiler by said linkage means when the actuator fails.

References Cited in the file of this patent

UNITED STATES PATENTS

| | | |
|---|---|---|
| 1,237,364 | Miller | Aug. 21, 1917 |
| 1,493,280 | Rees | May 6, 1924 |
| 2,357,465 | Focht | Sept. 5, 1944 |
| 2,510,506 | Lindhagen et al. | June 6, 1950 |
| 2,620,622 | Lundberg | Dec. 9, 1952 |
| 2,637,164 | Robson et al. | May 5, 1953 |
| 2,657,881 | Douglas | Nov. 3, 1953 |
| 2,681,548 | Kappus | June 22, 1954 |

FOREIGN PATENTS

| | | |
|---|---|---|
| 523,637 | Belgium | Nov. 14, 1953 |
| 524,592 | Belgium | Dec. 15, 1953 |
| 1,020,287 | France | Nov. 12, 1952 |
| 244,761 | Switzerland | June 2, 1947 |